US011994598B2

(12) United States Patent
Molina

(10) Patent No.: US 11,994,598 B2
(45) Date of Patent: May 28, 2024

(54) METHOD AND APPARATUS FOR PERFORMING JOINT CHANNEL AND TIME ESTIMATION IN A GNSS RECEIVER

(71) Applicant: European Space Agency, Noordwijk (NL)

(72) Inventor: Jose Antonio Garcia Molina, Leiden (NL)

(73) Assignee: EUROPEAN SPACE AGENCY, Paris (FR)

(*) Notice: Subject to any disclaimer, the term of this patent is extended or adjusted under 35 U.S.C. 154(b) by 784 days.

(21) Appl. No.: 17/058,219

(22) PCT Filed: May 24, 2018

(86) PCT No.: PCT/EP2018/063660
§ 371 (c)(1),
(2) Date: Nov. 24, 2020

(87) PCT Pub. No.: WO2019/223870
PCT Pub. Date: Nov. 28, 2019

(65) Prior Publication Data
US 2021/0132237 A1    May 6, 2021

(51) Int. Cl.
G01S 19/25    (2010.01)
G01S 19/24    (2010.01)
(Continued)

(52) U.S. Cl.
CPC .......... *G01S 19/256* (2013.01); *G01S 19/243* (2013.01); *G01S 19/30* (2013.01); *G01S 19/44* (2013.01); *G06N 7/01* (2023.01)

(58) Field of Classification Search
CPC ........ G01S 19/14; G01S 19/256; G01S 19/24; G01S 19/243; G01S 19/30; G01S 19/44; G06N 7/01; H04B 1/7073
(Continued)

(56) References Cited

U.S. PATENT DOCUMENTS 5,963,582 A    10/1999  Stansell, Jr.
8,184,046 B2 *  5/2012  Bickerstaff ............. G01S 19/42
                                              342/357.64
(Continued)

FOREIGN PATENT DOCUMENTS

KR    102201538 B1 *  7/2012  ............. G01S 19/54
KR    102201538 B1 *  1/2021  ............. G01S 19/10

OTHER PUBLICATIONS

International Preliminary Report on Patentability of the International Searching Authority, dated Dec. 3, 2020, PCT.
(Continued)

*Primary Examiner* — Chuong P Nguyen
(74) *Attorney, Agent, or Firm* — DINSMORE & SHOHL LLP

(57) ABSTRACT

A receiver is provided for use with a global navigation satellite system (GNSS) comprising multiple satellites. The receiver comprises a receiver clock and at least one antenna for receiving multiple signals over multiple respective channels, each channel being defined by a transmitting satellite and a receiving antenna at opposing ends of the channel. The receiver further comprises at least one correlator for calculating cross-correlation functions between (i) the signals received over the multiple channels and (ii) reference versions of the navigation signals provided by the receiver. The receiver is configured to use the calculated cross-correlation functions to perform a joint estimate of (i) a clock bias of the receiver clock relative to the time reference maintained by the GNSS, and (ii) a composite channel comprising the combined contribution of the multiple channels as a function of time-delay.

23 Claims, 6 Drawing Sheets

(51) Int. Cl.
*G01S 19/30* (2010.01)
*G01S 19/44* (2010.01)
*G06N 7/01* (2023.01)

(58) Field of Classification Search
USPC ..... 342/352, 357.64, 357.63, 357.69, 357.77
See application file for complete search history.

(56) References Cited

U.S. PATENT DOCUMENTS

| | | | | |
|---|---|---|---|---|
| 9,020,756 | B2* | 4/2015 | Abraham | H04B 1/70757 701/469 |
| 10,884,136 | B2* | 1/2021 | Anderson | G01S 19/243 |
| 2005/0080561 | A1 | 4/2005 | Abraham et al. | |
| 2005/0116859 | A1* | 6/2005 | Miller | G01S 19/14 342/357.36 |
| 2007/0183486 | A1* | 8/2007 | Cheng | G01S 19/25 375/150 |
| 2021/0033737 | A1* | 2/2021 | Younis | G01S 1/024 |
| 2021/0255332 | A1* | 8/2021 | Kowada | G01S 19/256 |

OTHER PUBLICATIONS

Gonzalo Seco-Granados et al., Challenges in Indoor Global Navigation Satellite Sytsems: Unveiling Its Core Features in Signal Processing; IEEE Signal Processing Magazine, IEEE Service Center, Piscataway, NJ. Mar. 10, 2012, vol. 29, No. 2., pp. 108-131.
Dimitri Rubin and Todd Young, Femtocells: Bringing Reliable Location and Timing Indoors; Rosum Corporation; Inside GNSS; Fall 2008; www.insidegnss.com; pp. 40-46.
NEO/LEA-M8T u-blox M8 Concurrent GNSS Timing Modules Data Sheet; www.u-blox.com; UBX-15025193-R03; Jun. 21, 2016, pp. 1-35.
David Lawrence et al., Innovation: Navigation from Leo; https:www.gpsworld.com/innovation-navigation-from-leo/; Jun. 30, 2017, pp. 1-16.
J.V. Cordaro et al., (Jun. 5-8, 2017) An Alternative Source of Timing and Location using the Low Earth Orbit Iridium Satellite Constellation [Session D3: Complementary PNT2: RF Aided (Non-GPS)], Joint Navigation Conference 2017, Dayton, Ohio, United States. https://www.ion.org/jnc/upload/JNC17-OnsiteProgram.pdf.
Thomas Jost et al., A Wideband Satellite-to-Indoor Channel Model for Navigation Applications; IEEE Transactions on Antennas and Propagation, vol. 62, No. 10, Oct. 2014; pp. 5307-5320.
Report ITU-R; Model parameters for the Physical Statistical Wideband Model in Recommendation ITU-R P.681; P Series, Radiowave Propagation; International Telecommunication Union; Sep. 2017; pp. 1-101.
GNSS Market Report, Issue 5, 2017, European Global Navigation Satellite Systems Agency; ISSN 2443-5236; pp. 1-100.
Gunter Hein and Andreas Teuber, GNSS Indoor Fighting the Fading Part 3, Working Papers, Inside GNSS; www.gnss.com, Jul./Aug. 2008; pp. 45-53.
J.A. Garcia-Molina and J.A. Fernandez-Rubio, Exploiting Spatial Diversity in Low cost SDR Platforms: The MIMO GNSS Approach; 2018; pp. 1-6.
ETSI TS 136 104 Report, Technical Specification; LTE; Evolved Universal Terrestrial Radio Access (E-UTRA); Base Station (BS) radio transmission and reception (3GPP TS 36.104 version 13.7.0 Release 13); Apr. 2017; pp. 1-215.

\* cited by examiner

METHOD AND APPARATUS FOR PERFORMING JOINT CHANNEL AND TIME ESTIMATION IN A GNSS RECEIVER

CROSS-REFERENCE TO RELATED APPLICATIONS

This application is a national stage application, filed under 35 U.S.C. § 371, of International Patent Application No. PCT/EP2018/063660, filed on May 24, 2018, which is incorporated by reference herein in its entirety.

FIELD

The present disclosure relates to a global navigation satellite system (GNSS), and in particular to performing joint channel and time estimation in a GNSS receiver for use in indoor conditions.

BACKGROUND

Global navigation satellite systems (GNSS) are becoming increasingly important in a wide range of applications, including in-car navigation support, location-based services for smartphones, and so on. Example implementations of a GNSS are described in WO 2006/063613 and WO 2007/101454. Such a GNSS may include a constellation of typically twenty to thirty satellites, each of which transmits a navigation signal incorporating a known spreading code (a predetermined pseudo-random noise sequence of bits or chips) which is unique to that satellite. Analogous to a conventional CDMA (code division multiple access) system, a receiver cross-correlates the received signal with the spreading codes for the various satellites to acquire the navigation signals for respective satellites that are currently visible (above the horizon). The navigation signal for a satellite also encodes the position of the satellite and the time of transmission to a high accuracy.

To make a positional determination, the receiver locates the maximum of the cross-correlation function between the acquired navigation signal of a given satellite and a version of the spreading code for that satellite which is held or generated internally within the receiver. The maximum of the cross-correlation function corresponds to a code-phase alignment (zero offset) between the received spreading code and the internal spreading code and is dependent on (i) the signal travel time from the satellite to the receiver, which is dependent on the spatial position of the satellite and the spatial position of the receiver and (ii) any timing (clock) bias (offset) between the satellite and the receiver. By acquiring code-phase information from multiple satellites, it is possible to solve for the (typically) unknown spatial position and clock bias of the receiver.

The accuracy of any such positional determination depends on how accurately the code-phase alignment can be determined based on the cross-correlation function. Most legacy GNSS navigation signals present a single maximum in their autocorrelation function which follows a known triangular shape around zero code-phase offset. Furthermore, new GNSS signals utilise a binary offset carrier (BOC) for the modulation of the transmitted navigation signal. This has the effect of narrowing the main peak of the autocorrelation function to support a more accurate estimation of position, albeit at the cost of new correlation peaks appearing in the autocorrelation function, thereby introducing an ambiguity in the code-phase estimation.

A typical approach for tracking the code-phase is to calculate the cross-correlation function for three different delays, referred to as Early, Prompt, and Late, whereby Prompt represents the expected delay (e.g., as determined from signal acquisition). The code-phase alignment can then be determined by fitting the expected correlation peak to the correlation values for these three different delays. Further details about BOC modulation and fitting the correlation peak are provided in EP 3104195.

As mentioned above, obtaining code-phase alignment for signals from multiple satellites allows the unknown spatial position and clock bias of the receiver to be determined. Although GNSS signals are primarily associated with the former aspect (position determination—hence the reference to navigation), there is also interest in the latter aspect. Thus determining the clock bias of the receiver allows a very accurate time to be obtained at the receiver, referenced to the very accurate time maintained within the overall GNSS.

Consequently, GNSS signals are used for time synchronization purposes in many different applications, including the telecoms, finance and energy sectors, such as described in "GNSS Market Report," Issue 5, 2017 (ISSN 2443-5236), European GNSS Agency (GSA). In general, the exploitation of GNSS signals is typically limited to outdoor applications (where there is no GNSS coverage problem), whereas the use of GNSS signals in indoor conditions is more challenging, as indicated in G. Seco-Granados, J. A. Lopez-Salcedo, D. Jimenez-Banos, G. Lopez-Risueno, "Challenges in Indoor Global Navigation Satellite Systems: Unveiling its core features in signal processing," IEEE Signal Processing Magazine, vol. 29, no. 2, pp. 108-131, 2012; G. Hein, and A. Teuber, "GNSS Indoors. Fighting the Fading. Part 3," Inside GNSS, pp. 45-53, July/August 2008; and D. Rubin, T. Young, "Femtocells: Bringing Reliable Location and Timing Indoors," InsideGNSS, Fall 2008. For example, in an indoor environment, a receiver may or may not receive a direct line-of-sight (LOS) signal from a satellite, and may also receive significant multipath, i.e., non-line-of-sight (NLOS), components. Because an NLOS component has a systematic delay relative to the LOS component, due to the extra travel distance, this can introduce a potential bias in the delay (and hence timing) estimation.

In the particular case of telecoms applications, GNSS synchronization is adopted in macro cells by telecoms service providers, while other synchronization technologies, such as wire-based solutions like the Precise Time Protocol, are being considered for indoor small cells to achieve timing accuracies in the sub-microsecond range (depending upon the particular network topology and other requirements).

Precise indoor time synchronization is expected to be of importance for future 5G telecom networks, where indoor small cells may be used to populate indoor areas to provide 5G services. Tight synchronization requirements between different cells may be needed for the transmission of such new 5G signals, of the order of 50 nanoseconds or below, as indicated in "LTE; Evolved Universal Terrestrial Radio Access (E-UTRA); Base Station (BS) radio transmission and reception (3GPP TS 36.104 version 13.7.0 Release 13)," ETSI TS 136 104 v13.7.0 (2017-04). In addition, accurate time synchronization may also potentially be used to provide accurate positioning based on ranging measurements derived from the 5G signals.

Although GNSS signals can still be used in mild indoor conditions for positioning and timing applications, this is at the cost of a degraded performance due to the impact of deep fading and strong multipath from non-line-of-sight (NLOS) components. In the particular case of timing applications, mass-market timing receivers (see e.g., "NEO/LEA-M8T: u-blox M8 concurrent GNSS timing modules. Data Sheet," 21 Jun. 2016, available at www.u-blox.com) are able to operate even with only one GNSS signal being tracked (if the receiver's position is a priori known) with expected accuracies in the order of 500 nanoseconds (1-sigma), as described in "NEO/LEA-M8T: u-blox M8 concurrent GNSS timing modules. Data Sheet," 21 Jun. 2016, available at www.u-blox.com. However, this accuracy is still significantly below the level desired for the proposed 5G services discussed above.

Recently, a new commercial timing service based on a low-earth orbit (LEO) constellation of the Iridium satellites has become available to provide accurate timing (and positioning) in indoor conditions such as described in J. V. Cordaro et al., "An Alternative Source of Timing and Location using the Low Earth Orbit Iridium Satellite Constellation," Joint Navigation Conference, Dayton, Ohio, June 2017, and D. Lawrence et al, "Innovation: Navigation from LEO," GPS World, June 2017.]. For this service, a timing accuracy of 100 nanoseconds (1-sigma) is claimed by the operator, which is closer to, although still not matching, the stringent requirements mentioned above for telecoms applications.

SUMMARY

In one aspect, a receiver is provided for use with a global navigation satellite system (GNSS) comprising multiple satellites. Each satellite transmits a respective navigation signal containing a spreading code. The GNSS maintains a time reference which is encoded into the navigation signals. The receiver comprises a receiver clock and at least one antenna for receiving multiple signals over multiple respective channels, each channel being defined by a transmitting satellite and a receiving antenna at opposing ends of the channel. The receiver further comprises at least one correlator for calculating cross-correlation functions between (i) the signals received over the multiple channels and (ii) reference versions of the navigation signals provided by the receiver. The receiver is configured to use the calculated cross-correlation functions to perform a joint estimate of (i) a clock bias of the receiver clock relative to the time reference maintained by the GNSS, and (ii) a composite channel comprising the combined contribution of the multiple channels as a function of time-delay.

Such a receiver supports the use of GNSS signals in indoor conditions for fine time synchronization, helping to mitigate the strong fading and NLOS multipath conditions in this type of scenario. The approach described herein seeks to provide robust and accurate time synchronization in indoor condition, without requiring the provision of any additional infrastructure (for example, wired networks, and/or other apparatus beyond a single GNSS receiver).

BRIEF DESCRIPTION OF THE DRAWINGS

Various implementations of the disclosure will now be described in detail by way of example only with reference to the following drawings.

DETAILED DESCRIPTION

Figure 1:
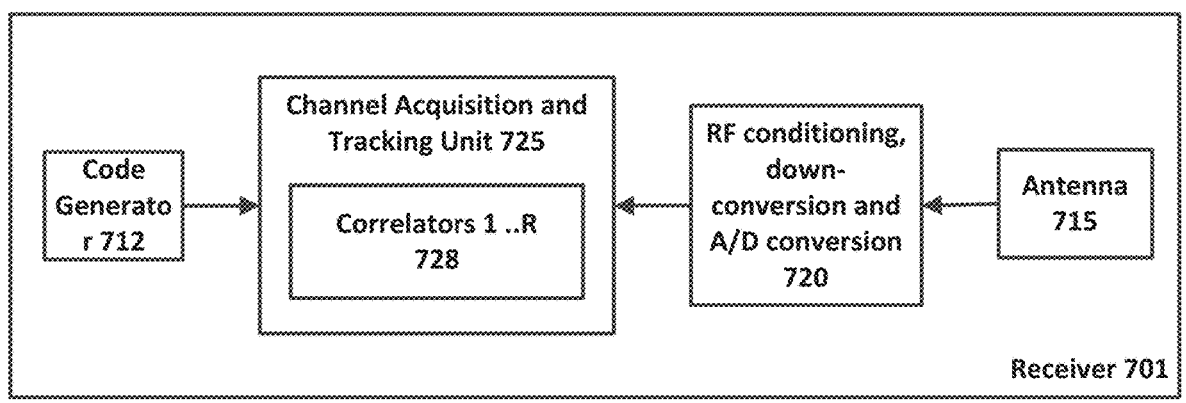
FIG. 1 is a schematic diagram of a receiver for receiving a GNSS navigation signal, according to one or more embodiments shown and described herein.

FIG. 1 is a high-level schematic block diagram of a receiver 701 suitable for use with a GNSS for receiving navigation signals from respective satellites. The receiver 701 may be provided as a stand-alone unit, or may be incorporated into some larger device, for example a mobile (cellular) telephone, a cellular radio access node (e.g., a 5G small cell), a computer, an automobile or other form of vehicle, a hospital bed, an aircraft or ship, a freight container, and so on. In operation, receiver 701 includes at least one antenna 715 for receiving GNSS signals. The antenna 715 links to an RF conditioning, down-conversion and A/D conversion unit 720, which in turn passes the base-band complex envelope of the signal received to channel acquisition and tracking unit 725.

The receiver 701 also includes a code generator 712, which can generate (or store) the spreading codes (pseudorandom noise sequences) for the satellite constellation. The channel acquisition and tracking unit 725 is provided by the code generator 712 with the relevant spreading codes so that the incoming channel(s) can be acquired from the base-band complex envelope of the received signal. The channel acquisition unit 725 utilises the appropriate number of spreading codes to support the sequential or parallel operation of the channel acquisition unit as appropriate, e.g., in accordance with the number of receiver channels. In the illustrated embodiment, the channel acquisition and tracking unit 725 includes R correlators 728.

The receiver 701 is configured to perform a joint estimate of (i) the clock bias and (ii) a composite channel, as described in more detail below. This processing may be integrated into the channel acquisition unit 725, or may be performed in a separate unit within the receiver 701 (not shown in FIG. 1), for example, in a processor, a digital signal processor (DSP), or any other suitable component.

Some navigation systems may include local elements (sometimes referred to as pseudolites). These are local positioning systems, for example at airports, which may supplement the positioning signals from a satellite navigation system to provide additional location information. It will be appreciated that a receiver 701 as described herein is intended to receive and process any suitable navigation signal (whether from a satellite, pseudolite, or any other relevant source), and to perform the joint estimation processing accordingly.

Figure 2:
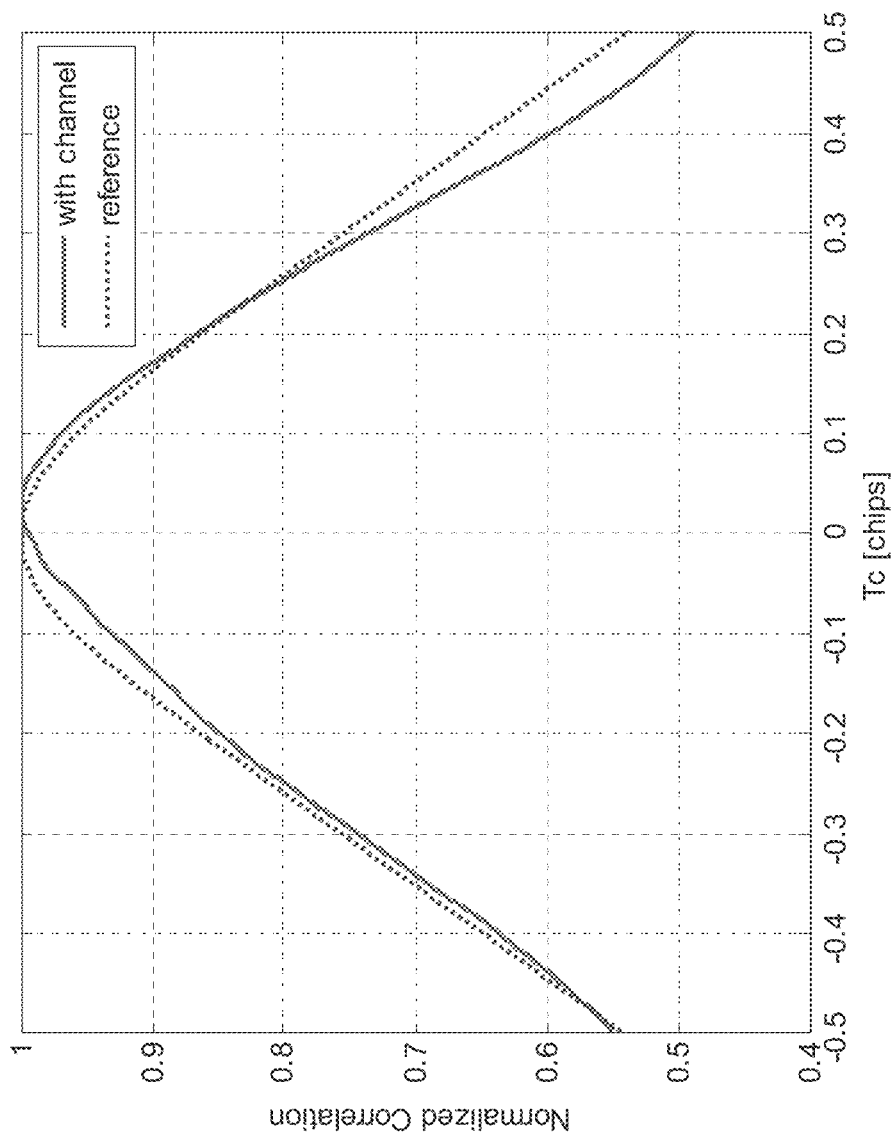
FIG. 2 is a plot showing an example of a distortion introduced into a correlation function by an indoor propagation channel for a given antenna and satellite.

FIG. 2 is a plot showing an example of the distortion introduced into the correlation function by the indoor propagation channel for a given antenna and satellite (as obtained with the channel model described in T. Jost et al., "A Wideband Satellit-to-Indoor Channel Model for Navigation Applications," IEEE Transactions on Antennas and Propagation, vol. 62, no. 10, October 2014, pp. 5307-5320, and Report ITU-R P.2145-2, "Model Parameters for the Physical-Statistical Wideband Model in Recommendation ITU-R P.681," September 2017). The reference correlation function (dashed line) is included for comparison, and has a peak aligned with zero. The observed correlation function (solid line) is distorted and slightly delayed (shifted to the right) due to the presence of (delayed) NLOS components, which also participate in the correlation function and hence bias the outcome (in contrast the reference correlation function can be considered as the correlation function that would be produced by receiving only the LOS component). Note in particular that the maximum of the distorted correlation function for the indoor channel in FIG. 2 is biased (delayed) with respect to the reference correlation function, which will then introduce a bias into any position and/or timing estimations.

Figure 3:
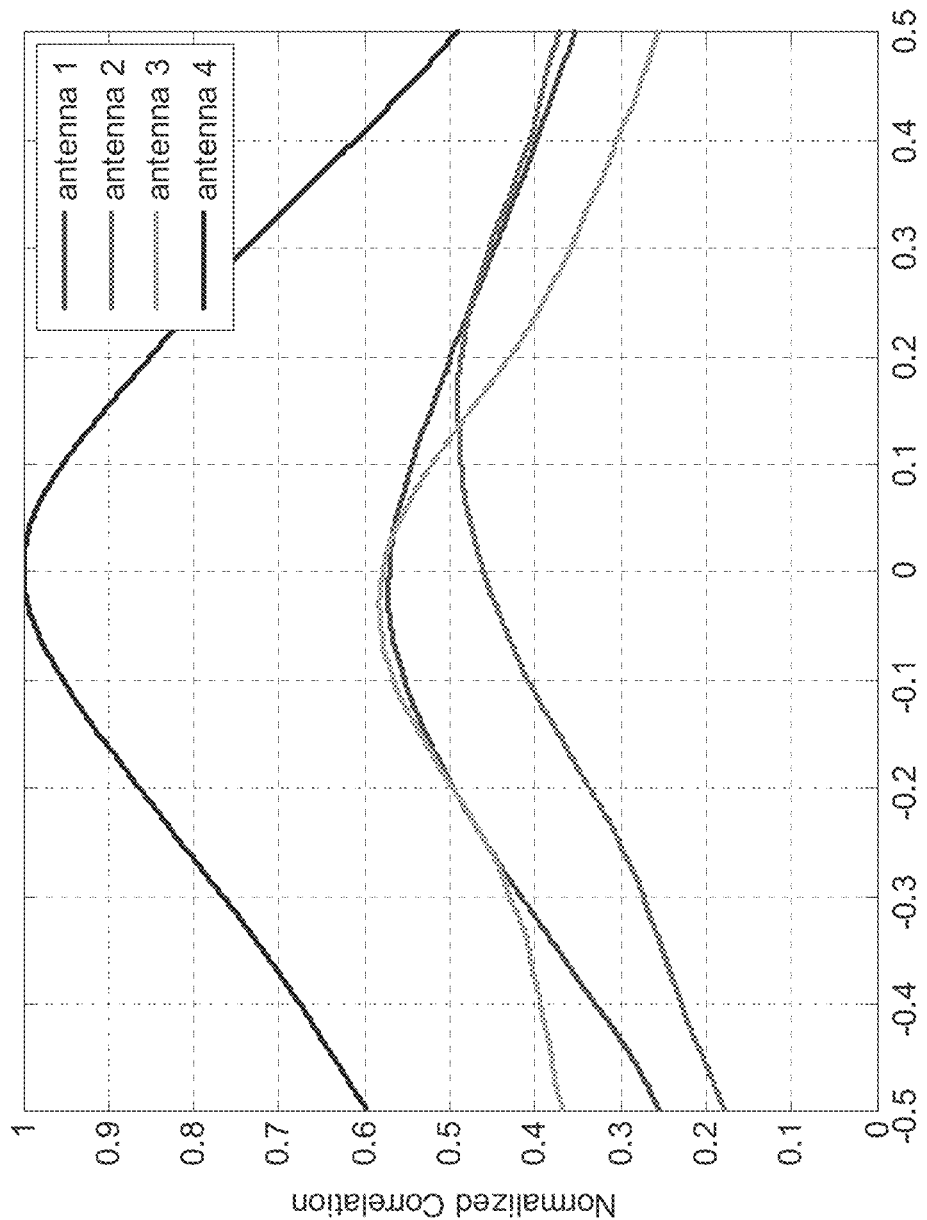
FIG. 3 is a plot showing examples of distortions introduced into a correlation function by an indoor propagation channel for different antennas and a given satellite.

FIG. 3 is a plot showing examples of distortion introduced in the correlation function by the indoor propagation channel for different antennas and a given satellite (again as obtained with the channel model in T. Jost et al., "A Wideband Satellite-to-Indoor Channel Model for Navigation Applications," IEEE Transactions on Antennas and Propagation, vol. 62, no. 10, October 2014, pp. 5307-5320, and Report ITU-R P.2145-2, "Model Parameters for the Physical-Statistical Wideband Model in Recommendation ITU-R P.681," September 2017). Note that the correlation functions are normalized such that the antenna having the highest correlation has a value of unity. (The different antennas typically have different locations and orientations, and hence experience a slightly different channel from each other). It can be seen that the antenna having the strongest correlation value also has the best shape in terms of a well-defined peak for the correlation function. In contrast, the correlation functions for the other antennas are generally somewhat distorted, having lower and less well-defined peaks (due to distortion from NLOS components and at least partial loss of the LOS component). Therefore any position and/or timing estimations based directly on these distorted correlation functions are susceptible to bias or error.

The approach described herein helps to overcome the bias/distortion such as illustrated in FIGS. 2 and 3. We consider a receiver having an array of N antennas (with N≥1) and receiving M navigation signals (with M≥1, all with equivalent correlation properties and transmitted in the same frequency band) from a given GNSS constellation (or any other satellite-based navigation system). The received signals from the M satellites are considered to be impacted by an indoor propagation channel. Based on this defined multiple-input multiple-output (MIMO) system, and considering a composite channel comprising the combined contribution of the M×N propagation channels of the MIMO system, a method is provided for the joint estimation of the composite channel and time synchronization (between the receiver clock and the time reference of the GNSS), based on the received satellite navigation signals.

The following pieces of information are considered to be known a priori:
 a) a baseline (phase offset) between each of the antennas and the phase centre of the receiver.
 b) the position of the receiver;
 c) a coarse clock bias for the receiver, $\mathring{\delta}t_c$;
Regarding (a), this is a property of the receiver itself, and may be determined using known measuring equipment. Regarding (b) and (c), these may be estimated using conventional techniques, such as implemented in existing GNSS receivers. For example, a receiver may initially perform a conventional acquisition of the navigation signals to obtain this position and timing (clock bias) information before performing the additional processing described herein. Alternatively (or additionally), the position and/or timing information may be known from other sources—e.g., the receiver may be located in a building whose position is already known, e.g., from mapping information, likewise timing information may be available from an external source (such as a telecommunications network or similar).

The composite channel is defined as the aggregate contribution of the M×N propagation channels—corresponding to the N received versions (one per antenna) of the M satellite signals—as a function of the time-delay with respect to the LOS signal (even though such a LOS signal may not be visible to the receiver). The composite channel gives a measure of the power delay profile for the resulting aggregated MIMO channel—i.e., the total aggregated power of all the received signal contributions as a function of the time-delay. Based on an estimation of the composite channel, an estimation of the clock bias of the receiver can also be derived—i.e., a joint estimation process is performed.

In general, each of the coefficients of the composite channel (one coefficient per time-delay, each coefficient reflecting the level of power transmission through the channel for that time-delay) will follow a probability density function (PDF) which is a priori unknown, and highly dependent on the propagation conditions of the receiver environment. As described below, the estimation of the composite channel is performed as a multi-hypothesis estimation problem in which different PDF assumptions for each coefficient of the composite channel are assessed.

The estimation of the composite channel is based on the composite cross-correlation function $\Lambda(\delta t)$, which is dependent on the clock bias. Accordingly, the estimation of the composite cross-correlation function at different discrete clock bias values $\delta t_n$ is of interest. In practice, the composite cross-correlation function is also dependent on other parameters, like the clock drift $\mathring{\delta}t$ and the phase center position of the receiver relative to the N antennas (among others).

Thus $\Lambda(\delta t_n) \triangleq \Lambda(\delta t_n, \mathring{\delta}t, p_0^T) = \Lambda(\Phi_{0,n})$, where the receiver's state vector $\Phi_{0,n} = [\delta t_n, \mathring{\delta}t, p_0^T]^T$ and the sub-index 0 refers to the phase center of the array of antennas (i.e., the phase centre position of the receiver). The composite cross-correlation function for the receiver's state vector $\Phi_{0,n}$, is derived, following J. A. Garcia-Molina and J. A. Fernandez-Rubio, "Exploiting Spatial Diversity in Low-cost SDR Platforms: the MIMO-GNSS approach," 6th International Colloquium on Scientific and Fundamental Aspects of GNSS/Galileo, Valencia, Spain, October 2017, as:

$$\hat{\Lambda}(\Phi_{0,n}) = \sum_{j=1}^{N} x_j^H B(\Phi_{0,n} - \Delta\Phi_j) \qquad \text{(equation 1)}$$
$$\left(B^H(\Phi_{0,n} - \Delta\Phi_j)B(\Phi_{0,n} - \Delta\Phi_j)\right)^{-1} B^H(\Phi_{0,n} - \Delta\Phi_j)x_j,$$

where the following definitions apply:
 a) $\Phi_{0,n} - \Delta\Phi_j$ is equivalent to the state vector per antenna $\Phi_{j,n} = [\delta t_n, \mathring{\delta}t, p_j^T]^T = [\delta t_n, \mathring{\delta}t, p_0^T]^T - [0,0, \Delta p_j^T]^T$. Note that $p_j = p_0 - \Delta p_j$, with $\Delta p_j$ the vector between the receiver's phase center and the j-th antenna. In practice:
 $\Phi_{j,n} \triangleq \Phi_{j,n}(t) = [\delta t_n(t), \mathring{\delta}t(t), p_j^T(t)]^T$,
 b) $x_j = [x_j(t_0) \ldots x_j(t_{K-1})]^T \in \mathbb{C}^{K \times 1}$ is the snapshot of K samples (with sampling period $T_s = t_K - t_{K-1}$) for the j-th antenna corresponding to the integration period being considered in the composite channel estimation ($x_j$ therefore represents the received signal at respective antenna j), c) $B(\Phi_j)=[b_1(\Phi_j) \ldots b_M(\Phi_j)]\in \mathbb{C}^{K\times M}$ is the basis function matrix for the state vector $\Phi_j$, which is composed by the basis function vectors for each satellite of the j-th antenna $b_i(\Phi_j)=[b_i(t_0, \Phi_j) \ldots b_i(t_{K-1}, \Phi_j)]^T \in \mathbb{C}^{K\times 1}$, d) the basis function $b_i(t,\Phi_j)$ for the i-th satellite and the j-th antenna is defined at time instant t as $b_i(t,\Phi_j)=d_i(t-\tau_{i,j}(t,\Phi_j))\exp\{j2\pi f_{i,j}(t,\Phi j)t\}$, with $d_i$ the complex baseband model of the signal transmitted by the i-th satellite.

The derivation is shown below:

A signal vector gathering all the signal snapshots observed by the N antennas is defined as:

$$y=S(\Phi_0)c+e, \quad (i)$$

where $y=[x_1^T \ldots x_N^T]^T \in \mathbb{C}^{NK\times 1}$, the vector $c=[a_1^T \ldots a_N^T]^T \in \mathbb{C}^{MN\times 1}$ gathers all the complex amplitudes for the MN paths in the MIMO-GNSS system, $e=[n_1^T \ldots n_N^T] \in \mathbb{C}^{NK\times 1}$ gathers the noise of all the antennas (with $e\sim CN(0, \sigma^2 I)$), and the multi-antenna basis function matrix is defined based on the single-antenna basis functions $B(\Phi_0-\Delta\Phi_j)$ as:

$$S(\Phi_0) = \begin{bmatrix} B(\Phi_0-\Delta\Phi_1) & 0 & \ldots & 0 \\ 0 & B(\Phi_0-\Delta\Phi_2) & \ldots & 0 \\ \vdots & \vdots & \ddots & \vdots \\ 0 & 0 & \ldots & B(\Phi_0-\Delta\Phi_N) \end{bmatrix}. \quad (ii)$$

The cost function is defined as $\Lambda_1(\Phi_0, c)=\|y-S(\Phi_0)c\|^2$, such that the MIMO maximum likelihood estimate (MLE) of the receiver's state vector $\Phi_0$ is found by minimizing $\Lambda_1(\Phi_0,c)$:

$$\hat{\Phi}_0, \hat{c} = \underset{\Phi_0,c}{\arg\min}\, \Lambda_1(\Phi_0, c). \quad (iii)$$

To find an efficient implementation of the MLE of the receiver's state vector, the cross-correlations are defined as $\hat{r}_{yy}=y^H y$, $\hat{r}_{ys}(\Phi_0)=S^H(\Phi_0)y$, and $\hat{R}_{ss}(\Phi_0)=S^H(\Phi_0)S(\Phi_0)$. Based on the previous definitions, and taking into account that the least-squares estimator of the complex amplitudes vector c is:

$$\hat{c}=\hat{R}_{ss}^{-1}(\Phi_0)\hat{r}_{ys}(\Phi_0), \quad (iv)$$

it can be readily shown that the cost function can be re-written as:

$$\Lambda_2(\Phi_0)=\hat{r}_{yy}-\hat{r}_{ys}^H(\Phi_0)\hat{R}_{ss}^{-1}(\Phi_0)\hat{r}_{ys}(\Phi_0) \quad (v)$$

Therefore, the MLE of the receiver's state vector can be re-defined as:

$$\hat{\Phi}_0 = \underset{\Phi_0}{\arg\max}\left\{\hat{r}_{ys}^H(\Phi_0)\hat{R}_{ss}^{-1}(\Phi_0)\hat{r}_{ys}(\Phi_0)\right\}. \quad (vi)$$

To apply this MLE of the state vector of the receiver to a real-time receiver, it is convenient to reformulate the maximization problem in (vi) based on the cross-correlations for each antenna of the receiver: $\hat{r}_{x_jb}(\Phi_j)=\hat{r}_{x_jb}(\Phi_0-\Delta\Phi_j)=B^H(\Phi_0-\Delta\Phi_j)x_j$, and $\hat{R}_{bb}(\Phi_j)=\hat{R}_{bb}(\Phi_0-\Delta\Phi_j)=B^H(\Phi_0-\Delta\Phi_j)B(\Phi_0-\Delta\Phi_j)$, resulting in $$\hat{\Phi}_0 = \underset{\Phi_0}{\arg\max}\sum_{j=1}^{N}\hat{r}_{x_jb}^H(\Phi_0-\Delta\Phi_j)\hat{R}_{bb}^{-1}(\Phi_0-\Delta\Phi_j)\hat{r}_{x_jb}(\Phi_0-\Delta\Phi_j) \quad (vii)$$

where the cost function is referred to as the "composite cross-correlation function" to be maximized w.r.t. the state vector $\Phi_0$, which can be re-written as:

$$\Lambda_3(\Phi_0) = \sum_{j=1}^{N} x_j^H B(\Phi_0-\Delta\Phi_j)\left(B^H(\Phi_0-\Delta\Phi_j)B(\Phi_0-\Delta\Phi_j)\right)^{-1}B^H(\Phi_0-\Delta\Phi_j)x_j \quad (viii)$$

(corresponding to Equation 1 above).

The coarse clock bias $\hat{\delta}t_c$, can be estimated, as noted above, using any suitable existing technique, e.g., as implemented within current receivers. In order to help decrease the computational complexity of the joint composite channel and time estimation process, the clock bias error typically obtained by state-of-the-art techniques in indoor conditions (usually of the order of hundreds of ns) may be reduced further to help to constrain the search space in the joint estimation problem. For example, an intermediate clock bias estimation may be performed to refine the initial coarse estimation $\hat{\delta}t_c$, by exploiting the composite cross-correlation function $\Lambda(\hat{\delta}t)$. The intermediate clock bias estimation $\hat{\delta}t_{int}$ can then be derived as:

$$\hat{\delta t}_{int} = \underset{\delta t}{\arg\max}\, \hat{\Lambda}(\delta t) \quad \text{(equation 2)}$$

$$\text{s.t. } |\delta t - \hat{\delta t}_c| < \alpha,$$

where $\alpha$ is a threshold dependent on the quality of the coarse clock bias estimation $\hat{\delta}t_c$, at the current epoch/integration period.

The received signal at each antenna can be regarded as the sum of multiple separate components, each component corresponding to the transmitted navigation signal but subject to a relative delay and change in amplitude. The line-of-sight (LOS) may be regarded as having zero delay in this respect, and all other components as having a positive delay. In some situations, the LOS component may not be visible.

To formalize this, the composite channel vector $h \in \mathbb{R}^{D\times 1}$ may contain the coefficients of the composite channel for D discrete time-delays of interest (uniformly distributed covering the channel delay spread), such that $[h]_m \triangleq h_m \in \mathbb{R}$ is the m-th coefficient of the composite channel vector; the coefficient $h_1$ corresponding to the LOS contributions marks the actual clock bias of the receiver, i.e., relative to the time reference of the GNSS, (the actual clock bias is to be estimated by the procedure described herein). In effect therefore, for a given component, $h_m$, the value of m specifies the time-delay (relative to the LOS component), while the value of $h_m$ determines the amplitude (or other measure of intensity) of the component having a time-delay m.

The coefficients of the components of the composite channel $\{[h]_m\}_{m=1}^{D}$ are considered to follow an arbitrary set of PDFs $\{p([h]_m)\}_{m=1}^{D} \triangleq \{p_{l,m}\}_{m=1}^{D}$, with $p_{l,m}$ the PDF adopted for the l-th hypothesis and the m-th coefficient, and with a total of $N_l$ hypotheses for the PDF followed by each coefficient. We define the fine clock bias estimator $\hat{\delta}t_f$ based on the intermediate clock bias ($\hat{\delta}t_{int}$ and the (positive or negative) integer offset $\beta \in \mathbb{Z}$ (to be estimated) as ($\hat{\delta}t_f=\hat{\delta}t_{int}-\beta T_\delta$, where $T_\delta$ is the time-delay resolution of the composite channel vector. Based on this, the joint estimator of h and $\beta$ for the l-th hypothesis can be defined as the solution to the constraint optimization problem, as per Equation (3):

$$\hat{h}_l, \hat{\beta}_l = \underset{h,\beta}{\mathrm{argmin}} \left\| \hat{\Lambda} - \sum_{m=1}^{D} [h]_m |s(\hat{\delta t}_{int} - (\beta - m + 1)T_\delta)|^2 \right\|^2 \quad \text{(equation 3)}$$

$$\text{s.t. } [h]_m \sim p_{l,m}, \forall m \text{ and } |\beta| < W,$$

where the following definitions apply:
a. $\hat{h}_l$ is the composite channel vector estimated under the l-th hypothesis for the channel PDFs $\{p([h]_m)\}_{m=1}^{D} \triangleq \{p_{l,m}\}_{m=1}^{D}$, with $\hat{h}_l = [\hat{h}_{l,1} \ldots \hat{h}_{l,D}]^T \in \mathbb{R}^{D \times 1}$,
b. $\hat{\beta}_l$ t is the integer offset estimated under the l-th hypothesis,
c. $W \in \mathbb{N}$ constrains the values evaluated for the integer offset $\beta$ (in total, $N_w = 2W-1$ values evaluated) based on the expected error of the intermediate clock bias $\hat{\delta t}_{int}$,
d. $\hat{\Lambda} = [\hat{\Lambda}(\delta t_1) \ldots \hat{\Lambda}(\delta t_Q)]^T \in \mathbb{R}^{Q \times 1}$ is the estimated composite cross-correlation vector for the MIMO system, which is uniformly sampling (with a time-delay resolution $T_\delta$) the composite cross-correlation function $\Lambda(\delta t)$ at Q clock offset values, being centered at the intermediate clock bias estimation $\hat{\delta t}_{int}$, such that $\delta t_{n|n=(Q+1)/2} = \hat{\delta t}_{int}$,
e. $s(\hat{\delta t}_{int} - (\beta - m + 1)T_\delta) \in \mathbb{R}^{Q \times 1}$ is a vector containing the samples of the reference correlation function (for the GNSS signal being considered) centered at the clock bias $(\hat{\delta t}_{int} - (\beta - m + 1)T_\delta)$.

Note that it is the value of $\beta$ which is ultimately of interest to define the time at the receiver with reference to the time within the GNSS.

In high-level terms, equation (3) defines a sum of squared differences between (i) the observed signal values (represented by $\hat{\Lambda}$, as per (d) above), and (ii) the predicted values for this hypothesis, which are determined based on (a) the original navigation signal (represented by s, as per (e)) above, (b) the hypothesized pattern of reflections for the signal received at each antenna, according to the predicted channel $\hat{h}_l$, as per (a) above, and the hypothesized time offset of the receiver clock, represented by $\hat{\beta}_l$, as per (b) above. The better the hypothesized values of $\hat{h}_l$ and $\hat{\beta}_l$ match the received data, the smaller the sum of squared differences.

The optimization is subject to two conditions. Firstly, a limited range of values ($\pm W$) for $\hat{\beta}_l$ are defined, which reduces the search space about the intermediate clock bias. Note that this is primarily a computational issue—with more computing resources available a wider search range could be explored for $\hat{\beta}_l$, to the extent that in some cases, the search might be performed using the coarse clock bias, without having to first derive an intermediate clock bias $\delta t_{int}$. Secondly, the values of $\hat{h}_l$ are constrained by a probability density function, represented by $p_{l,m}$ as discussed in more detail below. One way of looking at $p_{l,m}$ is as a form of regularization, which ensures the different values of $\hat{h}_l$ are physically plausible (rather than allowing any arbitrary values of $\hat{h}_l$); this also helps to reduce the risk of over-fitting.

The optimization problem set out in equation (3) can be solved, for example, using Monte Carlo methods, whereby the coefficients of the composite channel vector h are treated as random variables drawn from the corresponding arbitrary PDFs $p_{l,m}$ (with $N_c$ Monte Carlo runs assessed for each coefficient in each hypothesis). In practice, the actual distribution of the coefficients depends heavily on the indoor channel propagation conditions. Thus multiple PDF hypotheses for the coefficients of the composite channel are evaluated, and following this approach, the estimated composite channel vector $\hat{h}$ is the one out of the $N_l$ estimated channel vectors $\hat{h}_l$ that results in the minimum mean square error between (i) the estimated composite cross-correlation and (ii) the reference model based on the composite channel vector being assessed.

Algorithm 1, as set out below, summarizes the composite channel and fine clock bias estimation (i.e., $\hat{h}$ and $\hat{\delta t}_f$) based on equation (3) when considering $N_l$ PDF hypotheses and $N_c$ Monte Carlo runs for each of the coefficients of the composite channel.

---

Algorithm 1 Joint composite channel and fine clock bias estimation

Input:
$\{x_j\}_{j=1}^{N}, \{\{b_i(t, \Phi_j)\}_{j=1}^{N}\}_{i=1}^{M}, \hat{\delta t}_c, \alpha, N_l, N_c, W, \{\{p_{l,m}\}_{m=1}^{D}\}_{l=1}^{N_l}, Q, D, s, T_\delta$ Output: $\hat{h}, \hat{\delta t}_f$
1: Initialize the minimum mean square error $\xi_{min} = \infty$
2: Estimate the intermediate clock bias $\hat{\delta t}_{int}$ based on equation (2)
3: Compute $\hat{\Lambda} = [\hat{\Lambda}(\delta t_1) \ldots \hat{\Lambda}(\delta t_Q)]^T$ centered at $\hat{\delta t}_{int}$ based on equation (1)
4: for l = 1 to $N_l$ do
5:   for c = 1 to $N_c$ do
6:     Draw the normalized channel coefficients $[h_{l,c}^{norm}]_m \sim p_{l,m}, \forall m$
7:     $h_{l,c} = h_{l,c}^{norm} \|\hat{\Lambda}\| / \|\Sigma_{m=1}^{D} [h_{l,c}^{norm}]_m | s(\hat{\delta t}_{int} + (m-1)T_\delta)|^2 \|$
8:     for $\beta = -W + 1$ to $W - 1$ do
9:       Compute $\xi_{l,c,\beta} = \|\hat{\Lambda} - \Sigma_{m=1}^{D} [h_{l,c}]_m | s(\hat{\delta t}_{int} - (\beta - m + 1)T_\delta)|^2 \|^2$
10:       if $\xi_{l,c,\beta} < \xi_{min}$ then
11:         $\xi_{min} = \xi_{l,c,\beta}$
12:         $\hat{h} = h_{l,c}$
13:         $\hat{\beta} = \beta$
14:       end if
15:     end for
16:   end for
17: end for
18: $\hat{\delta t}_f = \hat{\delta t}_{int} - \hat{\beta} T_\delta$

---

Algorithm 1A, as set out below, summarizes the composite channel and fine clock bias estimation based on equation (3) for the particular case in which N=1 (a single antenna is used by the receiver) and $N_l = 1$ (a single hypothesis for each coefficient is considered in the estimation process), such that $p_{1,m}$ is the PDF for the m-th coefficient, $\Phi_1$ is the state vector of the receiver's antenna, and $x_1$ is the snapshot of K samples gathered by the receiver's antenna.

---

Algorithm 1A Joint composite channel and fine clock bias estimation for the particular case in which N = 1 and $N_l = 1$.

Input: $x_1, \{b_i(t, \Phi_1)\}_{i=1}^{M}, \hat{\delta t}_c, \alpha, N_c, W, \{p_{1,m}\}_{m=1}^{D}, Q, D, s, T_\delta$
Output: $\hat{h}, \hat{\delta t}_f$
1: Initialize the minimum mean square error $\xi_{min} = \infty$
2: Estimate the intermediate clock bias $\hat{\delta t}_{int}$ based on equation (2)
3: Compute $\hat{\Lambda} = [\hat{\Lambda}(\delta t_1) \ldots \hat{\Lambda}(\delta t_Q)]^T$ centered at $\hat{\delta t}_{int}$ based on (1) for N = 1
4: for c = 1 to $N_c$ do
5:   Draw the normalized channel coefficients $[h_c^{norm}]_m \sim p_{1,m}, \forall m$
6:   $h_c = h_c^{norm} \|\hat{\Lambda}\| / \|\Sigma_{m=1}^{D} [h_c^{norm}]_m | s(\hat{\delta t}_{int} + (m-1)T_\delta)|^2 \|$
7:   for $\beta = -W + 1$ to $W - 1$ do
8:     Compute $\xi_{c,\beta} = \left\| \hat{\Lambda} - \Sigma_{m=1}^{D} [h_c]_m \left| s(\hat{\delta t}_{int} - (\beta - m + 1)T_\delta) \right|^2 \right\|^2$
9:     if $\xi_{c,\beta} < \xi_{min}$ then
10:       $\xi_{min} = \xi_{c,\beta}$
11:       $\hat{h} = h_c$
12:       $\hat{\beta} = \beta$
13:     end if
14:   end for
15: end for
16: end for
17: $\hat{\delta t}_f = \hat{\delta t}_{int} - \hat{\beta} T_\delta$ In general, the PDFs $\{p_m\}_{m=1}^D$ can be set to any desired distribution. One option is to define a set of default PDFs representative of different types of environments, from light-indoor to deep-indoor conditions, as derived from theoretical models, ray-tracing models, and/or from real data for those environments—e.g., using a database of representative indoor conditions. For static receivers, another possibility is to estimate the PDFs $\{p_m\}_{m=1}^D$ for the D coefficients of the composite channel based on the estimated coefficients $\{[\hat{h}]_m\}_{m=1}^D$ of the previous epochs available—i.e., building or refining the PDFs based on the coefficients estimated so far. For periods of time which are sufficiently long (e.g., several days) such that all possible geometries between the GNSS satellites and the receiver antennas are encountered, the resulting $\{\hat{p}_m\}_{m=1}^D$ should characterize the propagation conditions of the receiver for the indoor conditions in which the receiver is located. In this situation, $\{\hat{p}_m\}_{m=1}^D$ can be regarded as a signature of the environment surrounding the receiver. Such estimation may be performed in a sequential (iterative) way for each epoch, updating the estimated PDFs $\{\hat{p}_m\}_{m=1}^D$ of the previous epoch to provide the new composite channel vector estimation $\hat{h}$ for the current epoch.

In an alternative approach, a joint estimator of h and β is defined by taking advantage of the spatial correlation of the NLOS multipath components between antennas. In other words, the NLOS components "seen" by the different antennas (located in slightly different positions) may have some level of mutual correlation. The level of this correlation depends on the distance between the antennas and the indoor propagation conditions.

The joint estimator can be defined as the solution to the constraint optimization problem $$\hat{h}_l, \hat{\beta}_l = \underset{h,\beta}{\mathrm{argmin}}\, \gamma(h, \beta) \quad \text{(equation 4)}$$

$$\text{s.t. } [h]_m \sim p_{l,m}, \forall_m \text{ and } |\beta| < W,$$

where the following definitions apply:

a)

$$\gamma(h, \beta) = \frac{\frac{1}{N}\sum_{j=1}^{N} \hat{\lambda}_j(h, \beta)}{\left(\prod_{j=1}^{N} \hat{\lambda}_j(h, \beta)\right)^{1/N}},$$

where $\hat{\lambda}_j(h,\beta)$ is the j-th eigenvalue associated to the spatial covariance matrix of the multipath mis-modelling errors, which is estimated as $\hat{C}_\varepsilon(h,\beta) = \hat{E}(h,\beta)\hat{E}(h,\beta)^T$, b) $\hat{E}(h,\beta) = [\hat{\varepsilon}_1(h,\beta) \ldots \hat{\varepsilon}_N(h,\beta)]^T \in \mathbb{R}^{Q \times N}$ is a matrix containing the vectors with the estimated multipath mis-modelling errors $\hat{\varepsilon}_j$ for each antenna, which are defined as:

$$\hat{\varepsilon}_j(h, \beta) = \hat{\theta}_j - \kappa_j(h)\sum_{m=1}^{D}[h]_m|s(\hat{\delta t}_{\mathrm{int}} - (\beta - m + 1)T_\delta)|^2, \quad \text{(equation 5)}$$

with $\kappa_j(h) = \|\hat{\theta}_j\|/\|\Sigma_{m=1}^D[h]_m|s(\hat{\delta t}_{int}+(m-1)T_\delta)|^2\|$, c) $\hat{\theta}_j = [\hat{\theta}_j(\delta t_1) \ldots \hat{\theta}_j(\delta t_Q)]^T \in \mathbb{R}^{Q \times 1}$ is the estimated composite cross-correlation vector for the j-th antenna, which is uniformly sampling (with a time-delay resolution $T_\delta$) the composite cross-correlation function $\theta_j(\delta t)$ at Q clock offset values, being centred at the intermediate clock bias estimation $\hat{\delta t}_{int}$, such that $\delta t_{n|n=(Q+1)/2} = \hat{\delta t}_{int}$, d) $\hat{\theta}_j(\delta t_n) \triangleq \hat{\theta}_j(\delta t_n, \hat{\delta t}, p_0^T) = \hat{\theta}_j(\Phi_{0,n})$ is estimated as:

$$\hat{\theta}_j(\Phi_{0,n}) = x_j^H B(\Phi_{0,n} - \Delta\Phi_j)(B^H(\Phi_{0,n} - \Delta\Phi_j)B(\Phi_{0,n} - \Delta\Phi_j))^{-1}B^H(\Phi_{0,n} - \Delta\Phi_j)x_j. \quad \text{(equation 6)}$$

Algorithm 2 summarizes the alternative composite channel and fine clock bias estimation based on equation (4) when considering $N_l$ PDF hypotheses and $N_c$ Monte Carlo runs for each of the coefficients of the composite channel.

---

Algorithm 2 Alternative joint composite channel and fine clock bias estimation

Input: $\{x_j\}_{j=1}^N$, $\{\{b_i(t, \Phi_j)\}_{j=1}^N\}_{i=1}^M$, $\delta t_c$, α, $N_l$, $N_c$, W, $\{\{p_{l,m}\}_{m=1}^D\}_{l=1}^{N_l}$, Q, D, s, $T_\delta$ Output: $\hat{h}$, $\hat{\delta t}_f$ 1: Initialize $\gamma_{min} = \infty$
2: Estimate the intermediate clock bias $\hat{\delta t}_{int}$ based on equation (2)
3: Compute $\hat{\theta}_j = [\hat{\theta}_j(\delta t_1) \ldots \hat{\theta}_j(\delta t_Q)]^T$ for each antenna centered at $\hat{\delta t}_{int}$ based on equation (6)
4: Compute $\hat{\Lambda} = [\hat{\Lambda}(\delta t_1) \ldots \hat{\Lambda}(\delta t_Q)]^T$ centered at $\hat{\delta t}_{int}$ based on equation (1)
5: for l = 1 to $N_l$ do
6:    for c = 1 to $N_c$ do
7:       Draw the normalized channel coefficients $[h_{l,c}^{norm}]_m \sim p_{l,m}$, $\forall_m$
8:       for j = 1 to N do
9:          $h_{l,c,j} = h_{l,c}^{norm} \|\hat{\theta}_j\|/\|\Sigma_{m=1}^D[h_{l,c}^{norm}]_m|s(\hat{\delta t}_{int} + (m-1)T_\delta)|^2\|$
10:      end for
11:      for β = −W + 1 to W − 1 do
12:        for j = 1 to N do
13:          $\varepsilon_{l,c,\beta,j} = \hat{\theta}_j - \Sigma_{m=1}^D[h_{l,c,j}]_m|s(\hat{\delta t}_{int} - (\beta - m + 1)T_\delta)|^2$
14:        end for
15:       Form $E_{l,c,\beta} = [\varepsilon_{l,c,\beta,1} \ldots \varepsilon_{l,c,\beta,N}]^T$
16:       $C_{l,c,\beta} = E_{l,c,\beta}E_{l,c,\beta}^T$
17:       Estimate the eigenvalues $\{\lambda_j\}_{j=1}^N$ of $C_{l,c,\beta}$
18:
$$\gamma_{l,c,\beta} = \frac{\frac{1}{N}\sum_{j=1}^{N}\lambda_j}{\left(\prod_{j=1}^{N}\lambda_j\right)^{1/N}}$$

19:       if $\gamma_{l,c,\beta} < \gamma_{min}$ then
20:          $\gamma_{min} = \gamma_{l,c,\beta}$ -continued Algorithm 2 Alternative joint composite channel and fine clock bias estimation 21: $\quad \hat{\underline{h}} = h_{l,c}{}^{norm} \, \|\hat{A}\|/\|\Sigma_{m=1}^{D}[h_{l,c}{}^{norm}]_m |s(\delta t_{int} + (m-1)T_\delta)|^2\|$
22: $\quad \hat{\beta} = \beta$
23: $\quad$ end if
24: $\quad$ end for
25: $\quad$ end for
26: end for
27: $\delta t_f = \delta \hat{t}_{int} - \hat{\beta} T_\delta$ Note that the inputs and the outputs in Algorithm 2 are the same as for Algorithm 1. Accordingly, Algorithm 2 can be seen as an alternative approach to performing the same overall analysis as performed in Algorithm 1. Furthermore, the skilled person will understand that these approaches are provided by way of example, and other approaches may be adopted according to the circumstances of any given implementation. For example, rather than using a Monte Carlo approach, one could perform a systematic search across a predetermined grid covering the space defining the possible (expected) values of $\hat{h}_l$ and $\hat{\beta}_l$. Furthermore, rather than performing a Monte Carlo or grid search, some implementations might use an optimization (feedback) scheme, which seeks to converge on some minimum for Equation (3) (analogous to a hill-climbing routine, only seeking a minimum rather than a maximum). In all cases, it will be understood that finding a minimum configuration will generally imply finding an approximate minimum (rather than an absolute minimum), e.g., due to limitations in the analysis performed (such as considering only $N_W$ values for $\hat{\beta}_l$ in equation (3)).

The method described herein has been simulated using the implementation of Algorithm 1 via a semi-analytical approach at post-correlation level by considering the realistic indoor propagation channel from T. Jost et al., "A Wideband Satellite-to-Indoor Channel Model for Navigation Applications," IEEE Transactions on Antennas and Propagation, vol. 62, no. 10, October 2014, pp. 5307-5320, and Report ITU-R P.2145-2, "Model Parameters for the Physical-Statistical Wideband Model in Recommendation ITU-R P.681," September 2017 and a receiver having a linear array of four antennas (with a separation of 10 cm between each of them). In the simulation $N_I=3$ (i.e., three hypotheses on the PDF of each of the composite channel coefficients were considered) and $N_c=10$. The spatial correlations between the signals received for each antenna are considered in the model. As a reference, the timing solution obtained based on the received signals from one of the antennas of the array and a conventional weighted least squares (WLS)-based solution is used. A single integration period is considered in both cases.

Figure 4:
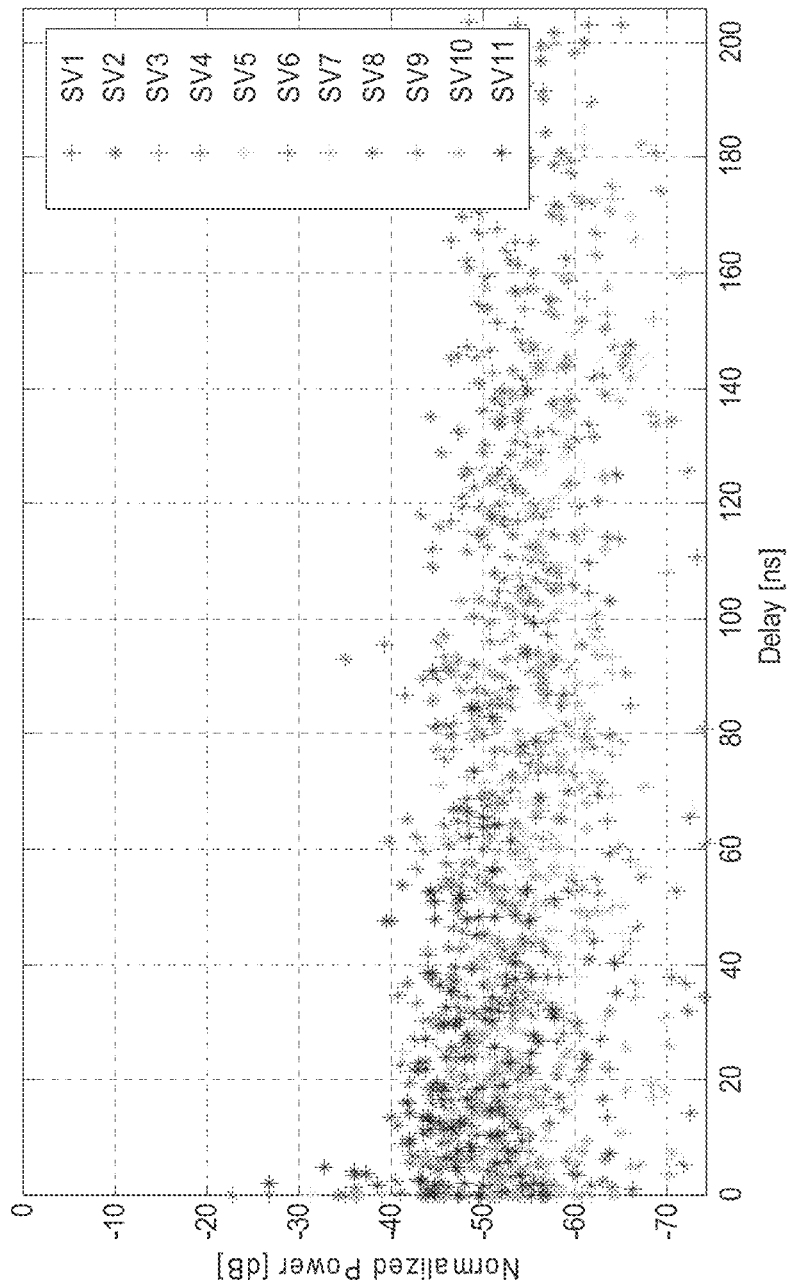
FIG. 4 shows examples of the power delay profile for simulated indoor conditions, according to one or more embodiments shown and described herein.
Figure 4A:
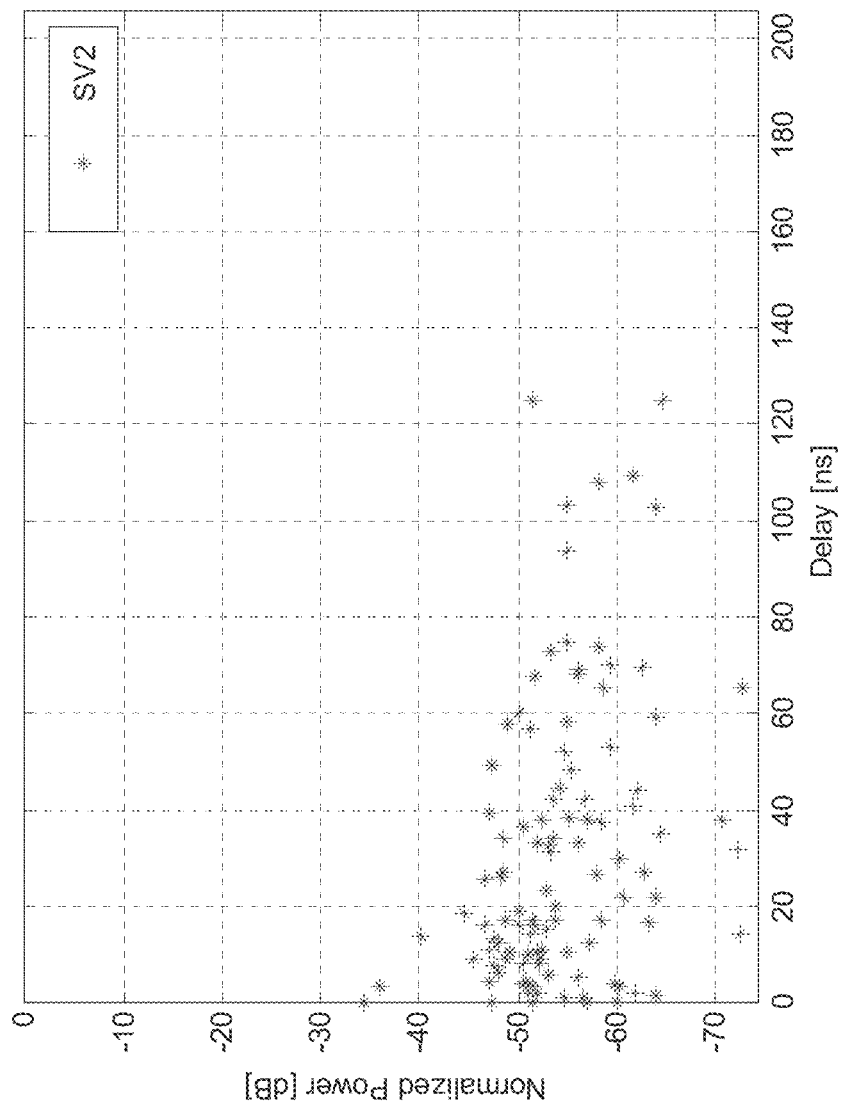
FIG. 4A shows a subset of the data of FIG. 4, showing the power delay profile for a single satellite, according to one or more embodiments shown and described herein.
Figure 4B:
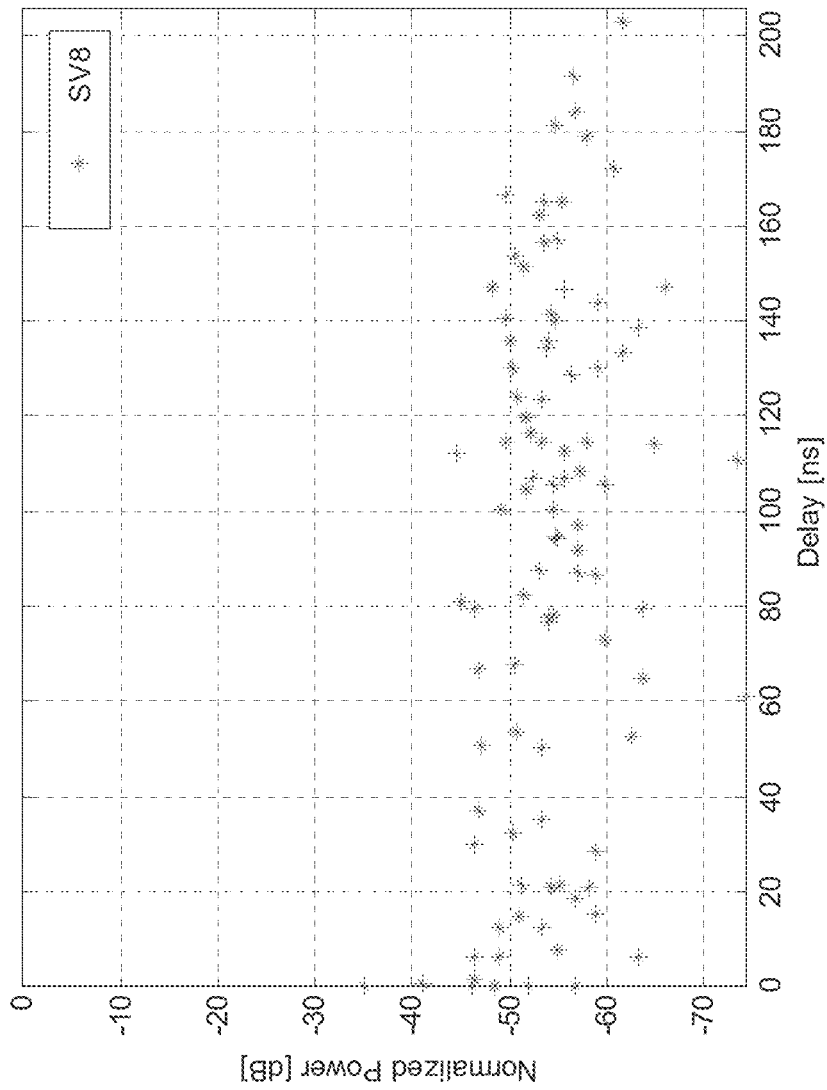
FIG. 4B show another subset of the data from FIG. 4, showing the power delay profile for a single, according to one or more embodiments shown and described herein.

FIG. 4 shows an example of the power delay profile for simulated indoor conditions (based on the channel model of T. Jost et al., "A Wideband Satellit-to-Indoor Channel Model for Navigation Applications," IEEE Transactions on Antennas and Propagation, vol. 62, no. 10, October 2014, pp. 5307-5320), with attenuations above 20 dB and important NLOS components for all the satellites. In particular, FIG. 4 shows the simulation results for a set of 11 visible satellites (SV1, SV2, . . . SV11), where the results for each satellite are plotted with a symbol having a particular shape/color for that respective satellite. FIGS. 4A and 4B show a subset of the data from FIG. 4, with FIG. 4A showing results for one satellite (denoted SV2) and FIG. 4B showing results for another satellite (denoted SV8).

Each symbol having the particular shape/color for a given satellite represents a signal component from that satellite. It can be seen that the number of signal components resulting from a single navigation signal (i.e., from one satellite) is relatively high—generally more than 10 or 20, typically in the range 30-120, e.g., 50-100, but potentially higher still. Each signal component is plotted based on:
  i) x-axis—the delay for that component in nanoseconds, relative to the ideal LOS component. By way of scaling, a delay of 10 nanoseconds corresponds to an additional travel distance of around 3 meters.
  ii) y-axis—normalized power (dB), where normalization here indicates that the total received power (across all components) for each satellite is set to a consistent level (i.e., the same for all satellites).

Note that there is considerable variation in the signal components received from different satellites, For example, FIG. 4B for satellite SV8 shows significantly more components with a higher delay (>100 ns) than FIG. 4A for satellite SV2). In addition, it will be appreciated that the desired accuracy in the delay estimation (of around 50 ns) is significantly less than the delay of some NLOS components (even for satellite SV2).

The simulation results are summarized in Table 1, which shows the timing errors (RMS and 95-percentile) for the WLS-based reference method and the approach described herein, specifically adopting algorithm 1 (note that additional calibration and satellite system dependent errors are not considered in the simulations). In particular, these Figures relate to the timing errors associated with determining $\hat{\beta}_l$, the clock bias of the receiver compared with the time reference maintained by the GNSS. The results obtained show a clear improvement in the time estimation of the clock bias performed with the method described herein compared with a conventional time estimation approach. This improvement is achieved by the approach described herein making better use of the NLOS signals (mitigating the bias introduced in the clock bias estimation), and by the exploitation of the signal diversity introduced by having an array of multiple antennas (although the approach described herein can be used even if only a single antenna is available, such as by utilizing Algorithm 1A as presented above).

TABLE 1

SUMMARY OF RESULTS

| Method | RMS (ns) | 95% (ns) |
| --- | --- | --- |
| WLS-based | 130 | 249 |
| Algorithm 1 | 27 | 51 |

Although the method described herein has a higher computational complexity than conventional timing architectures, it is well-suited to a parallel implementation in order to reduce the computational burden. Furthermore, the computation of the composite channel may be performed over a longer period, taking advantage of the relatively slow decorrelation of the indoor channel for static receivers (typically of the order of several seconds).

The approach described herein allows satellite navigation signals (including, but not limited to, current GNSS) to help achieve timing accuracies below around 50 ns (1-sigma) in indoor conditions. Such timing accuracies may help to support the use of current GNSS signals in indoor timing applications (without having to rely on other commercial services), such as the proposed 5G network operations mentioned above. In the approach described herein, a joint composite channel and time estimation method is provided to address the low carrier-to-noise (C/No) conditions and the high impact of NLOS multipath components which are generally experienced in such an indoor environment. As described above, this approach has been assessed via software simulations considering a realistic indoor propagation channel and shows a clear improvement of the resulting time synchronization performance with respect to a conventional time estimation approach.

Although the approach described herein is primarily intended to allow an accurate determination of the timing offset of a receiver clock for the case of indoor reception of GNSS signals, it can also be used more generally to determine the multipath components (such as shown in FIG. 4) of the received signals. This approach may be used to help remove bias (distortion) from the cross-correlation functions, thereby providing a more accurate estimate of the location (instead of or as well as the clock offset) of the receiver in an indoor environment. In addition, the approach may be used to obtain information about the indoor environment. For example, if the observed multipath components change, this may indicate some change in conditions within the environment (such as a door opening or closing), and hence might be utilized, for example, for some form of monitoring system.

Although the approach described herein is primarily intended for use with existing or future GNSS such as GPS and Galileo, the term GNSS should be understood to include any system which provides suitable satellite (or pseudolite) signals for performing the methods described herein, even if such signals are not necessarily provided for navigation purposes (or at least, this is not their main purpose). For example, the satellite signals utilized herewith might be primarily intended for time synchronisation and/or for telecommunications (rather than for position location).

The approach described herein provides a receiver for use with a global navigation satellite system (GNSS) comprising multiple satellites. Each satellite transmits a respective navigation signal containing a spreading code. The GNSS maintains a time reference which is encoded into the navigation signals. The receiver comprises a receiver clock and at least one antenna for receiving multiple signals over multiple respective channels, each channel being defined by a transmitting satellite and a receiving antenna at opposing ends of the channel. The receiver further comprises at least one correlator for calculating cross-correlation functions between (i) the signals received over the multiple channels and (ii) reference versions of the navigation signals provided by the receiver. The receiver is configured to use the calculated cross-correlation functions to perform a joint estimate of (i) a clock bias of the receiver clock relative to the time reference maintained by the GNSS, and (ii) a composite channel comprising the combined contribution of the multiple channels as a function of time-delay.

The signals received over the respective channels typically include contributions from multiple navigation signals; these are contributions are usually below the noise level, but can be discriminated by cross-correlating with the known codes for the different navigation signals. Each cross-correlation function is generally calculated based on (i) a corresponding received signal (for a given channel) and (ii) a corresponding navigation signal (for a given satellite). The receiver will normally only detect a subset of the navigation signals—the remainder may correspond, for example, to satellites that are below the horizon. (In some cases the receiver may have almanac information available and know upfront which satellites are currently below the horizon) It is also possible that a given navigation signal may be detected only on a subset of the channels, for example, due to strong attenuation or fading on one or more other channels. If a given cross-correlation function for a corresponding channel and satellite does not locate the navigation signal (i.e., no correlation peak is found), this cross-correlation function may be discounted from the joint estimate.

In general, the receiver is configured to use the calculated cross-correlation function between the signal received over a given channel and the reference version of the given navigation signal to determine a code-phase alignment between the received navigation signal and the reference version of this navigation signal. This code-phase alignment is dependent upon: (i) the propagation time of the given navigation signal from the satellite to the receiver and (ii) the clock bias between the receiver clock and the time reference maintained by the GNSS. For a receiver of known position, propagation time can be determined, thereby exposing the clock bias to measurement.

The receiver described herein is well-suited for use in indoor conditions, which generally suffer from (i) fading or sometimes complete absence of a direct (line-of-sight) component, and (ii) the presence of usually multiple non-line-of-sight components. The joint estimation utilizes information received over all channels (including information from multipath components) to help obtain a higher accuracy for the clock bias than can generally be achieved with existing techniques.

In some implementations, the clock bias of the receiver clock is estimated as an offset from an approximate clock bias. The approximate clock bias may be derived from conventional techniques and have an uncertainty which is greater than the desired accuracy for the clock bias provided herein. For example, the approximate clock bias may have a typical accuracy (1-sigma) in the range 0.1-1 microseconds, or in the range 0.2-0.8 microseconds, or in the range 0.25-0.6 microseconds. In some implementations, the receiver may be configured to estimate the approximate clock bias, prior to performing the joint estimation, by using the calculated cross-correlation functions to determine a maximum of a composite cross-correlation function for the composite channel. (This latter approach will generally provide a more accurate preliminary estimate for the approximate clock bias than conventional techniques, and so reduce the search space for the joint estimate, as described below).

The composite channel may represent a multiple-input multiple-output (MIMO) channel, where the multiple inputs correspond to the various satellites, and the multiple outputs correspond to different antennas. However, in some cases the receiver may have just a single antenna, in which case there is only a single output. Note that in cases where there are multiple antennas (i.e., a MIMO channel), the joint estimate may take advantage of spatial correlation between the signals received by different antennas to enhance the accuracy of the joint estimate.

The joint estimate of the clock bias and composite channel can be considered as an optimization problem, i.e., finding a clock bias and composite channel that would most closely reproduce the calculated cross-correlation functions. This optimization can be performed using any suitable search technique, for example, a grid search, an iterative technique (such as hill-climbing), and so on. For the clock bias, the search may be performed within a window centered (at least approximately) on an overall code-phase alignment of the calculated cross-correlation functions, or by using any other suitable method. As noted above, having a prior known estimate for the clock bias reduces the search space, the more accurate the prior known estimate, the smaller the search space can be.

The composite channel represents a more complex parameter space. For example, the composite channel may be specified by a set of coefficients, each coefficient corresponding to a particular time-delay, and representing the aggregate level of power transmission through the composite channel for that time-delay (e.g., as a fraction of the total power received into the channel). In some implementations, the receiver includes at least one probability distribution function for each coefficient in the set of coefficients, and this probability distribution function is used to generate trial values for the coefficients. In some cases, the search space may encompass the use of multiple different probability distribution functions for the coefficients. There are various ways to define or provide such probability distribution functions. For example, the probability distribution functions may be determined from simulations of typical indoor propagation channels, such as shown in FIGS. 4, 4A and 4B. Another possibility is that the provided probability distribution functions are based on an estimate of the composite channel obtained using received signals from a previous epoch (if available). For example, the first epoch of measurement may use probability distribution functions obtained from simulations, however, subsequent epochs may use probability distribution functions determined from earlier epochs. In some cases, the receiver may be configured to update the existing probability distribution functions after each new joint estimate of the composite channel becomes available, hence allowing a continuous and ongoing (iterative) enhancement of the probability distribution functions used for the coefficients.

Also provided herein is a method of operating a receiver for use with a global navigation satellite system (GNSS) comprising multiple satellites, wherein each satellite transmits a respective navigation signal containing a spreading code, and wherein the GNSS maintains a time reference which is encoded into the navigation signals. The receiver comprises a receiver clock and at least one antenna for receiving multiple signals over multiple respective channels, each channel being defined by a transmitting satellite and a receiving antenna at opposing ends of the channel. The method comprises calculating cross-correlation functions between (i) the signals received over the multiple channels and (ii) reference versions of the navigation signals provided by the receiver; and performing a joint estimate of (i) a clock bias of the receiver clock relative to the time reference maintained by the GNSS, and (ii) a composite channel comprising the combined contribution of the multiple channels as a function of time-delay, using the calculated cross-correlation functions. This approach is particularly suitable for use in an indoor environment, which is typically subject to multipath (non-line-of-sight) components and/or fading of the direct (line-of-sight) components. This method can generally benefit from the same features and enhancements discussed above.

The approach described herein may be implemented into some form of receiver, whether provided as a standalone receiver or incorporated into some other type of device—e.g., a mobile telephone, a cellular radio access node (e.g., a 5G small cell), a tablet, a vehicle GPS (car, plane, ship, bicycle, etc.), camera, or any other appropriate location monitoring/tracking system. The receiver may implement such a method at least in part by executing program instructions on one or more processors (such as DSPs, GPUs, etc.), and/or the receiver may implement such a method at least in part by utilising special purpose hardware—e.g., one or more chips specially designed to support the method, e.g., by providing multiple hardware correlators, etc. A computer program may also be provided for implementing the approach described herein. Such a computer program typically comprises computer program instructions which may be provided on a non-transitory computer readable storage medium, such as an optical disk (CD or DVD), hard disk, or flash memory. The computer program may be loaded into a computer memory from such a storage medium, or may be downloaded into the computer memory over a network, such as the Internet. The apparatus, e.g., receiver, loading the computer program may comprise one or more processors for executing the computer program, which comprises instructions that cause the apparatus to implement a method such as described above.

In conclusion, a variety of implementations have been described herein, but these are provided by way of example only, and many variations and modifications on such implementations will be apparent to the skilled person and fall within the scope of the present disclosure, which is defined by the appended claims and their equivalents.

What is claimed is:

1. A receiver for use with a global navigation satellite system (GNSS) comprising multiple satellites, wherein each satellite transmits a respective navigation signal containing a spreading code, and wherein the GNSS maintains a time reference which is encoded into the navigation signals, the receiver comprising:
a receiver clock;
at least one antenna for receiving multiple signals over multiple respective channels, each channel being defined by a transmitting satellite and a receiving antenna at opposing ends of the channel; and
at least one correlator for calculating cross-correlation functions between (i) the signals received over the multiple channels and (ii) reference versions of the navigation signals provided by the receiver;
wherein the receiver is configured to use the calculated cross-correlation functions to perform a joint estimate of (i) a clock bias of the receiver clock relative to the time reference maintained by the GNSS, and (ii) a composite channel comprising the combined contribution of the multiple channels as a function of time-delay; and
wherein the clock bias of the receiver clock is estimated as an offset from an approximate clock bias.

2. The receiver of claim 1, wherein the signals received over the respective channels include contributions from one or more of the navigation signals.

3. The receiver of claim 2, wherein the receiver is configured to detect a given navigation signal included in a signal received over a given channel based on the calculated cross-correlation function between the signal received over the given channel and the reference version of the given navigation signal.

4. The receiver of claim 3, wherein the receiver is further configured to use the calculated cross-correlation function between the signal received over the given channel and the reference version of the given navigation signal to determine a code-phase alignment between the received given navigation signal and the provided reference version of the given navigation signal.

5. The receiver of claim 4, wherein the code-phase alignment is dependent upon: (i) the propagation time of the given navigation signal from the satellite to the receiver and (ii) the clock bias between the receiver clock and the time reference maintained by the GLASS.

6. The receiver of claim 4, wherein the calculated cross-correlation functions used for performing the joint estimate are centered on the determined code-phase alignment for each satellite.

7. The receiver of claim 2, wherein the contributions for the one or more navigation signals include multiple non-line-of-sight components.

8. The receiver of claim 1, wherein the time-delay is referenced to arrival of a line-of-sight component.

9. The receiver of claim 1, wherein the approximate clock bias is equal to an initial estimated clock bias having a typical accuracy (1-sigma) in the range 0.1-1 microseconds.

10. The receiver of claim 1, wherein the receiver is configured to estimate the approximate clock bias, prior to performing the joint estimation, by using the calculated cross-correlation functions to determine a maximum of a composite cross-correlation function for the composite channel.

11. The receiver of claim 10, wherein the composite cross-correlation function is defined by $$\hat{\Lambda}(\Phi_{0,n}) = \sum_{j=1}^{N} x_j^H B(\Phi_{0,n} - \Delta\Phi_j)\big(B^H(\Phi_{0,n} - \Delta\Phi_j)$$

$$B(\Phi_{0,n} - \Delta\Phi_j)\big)^{-1} B^H(\Phi_{0,n} - \Delta\Phi_j) x_j;$$

wherein:
$\Phi_{0,n}$ comprises a state vector of the receiver;
$\Phi_{0,n} - \Delta\Phi_j$ comprises a state vector per antenna;
$x_j$ comprises the signal received at antenna j; and
$B(\Phi_j)$ comprises a basis function matrix for the state vector $\Phi_j$.

12. The receiver of claim 1, wherein performing the joint estimate of the clock bias includes searching a predefined range of possible clock bias values.

13. The receiver of claim 1, wherein the composite channel is specified by a set of coefficients, each coefficient corresponding to a particular time-delay, and representing the aggregate level of power transmission through the composite channel for that time-delay.

14. The receiver of claim 13, wherein the receiver includes at least one probability distribution function for each coefficient in the set of coefficients.

15. The receiver of claim 14, wherein the provided probability distribution functions are based on an estimate of the composite channel obtained using received signals from a previous epoch.

16. The receiver of claim 15, wherein the receiver is configured to update the probability distribution functions based on the estimated composite channel.

17. The receiver of claim 14, wherein receiver performs the joint estimate using a Monte Carlo search based on trial values of the composite channel, generated in accordance with the probability density functions, to find the trial values and clock bias that best fit the calculated cross-correlation functions.

18. The receiver of claim 1, wherein performing the joint estimate is defined by:

$$\hat{h}_l, \hat{\beta}_l = \underset{h,\beta}{\arg\min} \left\| \hat{\Lambda} - \sum_{m=1}^{D} [h]_m \left| s(\widehat{\delta t}_{int} - (\beta - m + 1)T_\delta) \right|^2 \right\|^2;$$
$$\text{s.t. } [h]_m \sim p_{l,m}, \forall_m \text{ and } |\beta| < W$$

wherein
$\hat{h}_l$ comprises a composite channel vector estimated under the l-th hypothesis for the channel PDFs $\{p([h]_m)\}_{m=1}^{D} \triangleq \{p_{l,m}\}_{m=1}^{D}$, with $\hat{h}_l = [\hat{h}_{l,1} \ldots \hat{h}_{l,D}]^T \in \mathbb{R}^{D \times 1}$,
$\hat{\beta}_l$ comprises an integer offset estimated under the l-th hypothesis;
$W \in \mathbb{N}$ constrains the values evaluated for the integer offset $\beta$ based on an expected error of an intermediate clock bias $\hat{\delta t}_{int}$;
$\hat{\Lambda} = [\hat{\Lambda}(\delta t_1) \ldots \hat{\Lambda}(\delta t_Q)]^T \in \mathbb{R}^{Q \times 1}$ comprises an estimated cross-correlation vector with uniform sampling, with a time-delay resolution $T_\delta$, of a composite cross-correlation function $\Lambda(\delta t)$ at Q clock offset values, being centered at the intermediate clock bias estimation $\hat{\delta t}_{int}$ such that $\delta t_{n|n=(Q+1)/2} = \hat{\delta t}_{int}$; and
$s(\hat{\delta t}_{int} - (\beta - m + 1)T_\delta) \in \mathbb{R}^{Q \times 1}$ comprises a vector containing samples of the reference correlation function centered at the clock bias $\hat{\delta t}_{int} - (\beta - m + 1)T_\delta$.

19. The receiver of claim 1, wherein the receiver includes multiple antennas, and the joint estimate takes advantage of spatial correlation between the signals received by different antennas.

20. The receiver of claim 19, wherein the performing the joint estimate is defined by:

$$\hat{h}_i, \hat{\beta}_l = \arg\underset{h,\beta}{\min} \gamma(h, \beta)$$

wherein $$\gamma(h, \beta) = \frac{\frac{1}{N}\sum_{j=1}^{N} \hat{\gamma}_j(h, \beta)}{\left(\prod_{j=1}^{N} \hat{\gamma}_{j(h,\beta)}\right)^{1/N}},$$

where $\hat{\gamma}_{j(h,\beta)}$ comprises the j-th eigenvalue associated with a spatial covariance matrix of multipath mis-modelling errors estimated as $\hat{C}_\varepsilon(h,\beta) = \hat{E}(h,\beta)\hat{E}(h,\beta)^T$;
$\hat{E}(h,\beta) = [\hat{\varepsilon}_1(h,\beta) \ldots \hat{\varepsilon}_N(h,\beta)]^T \in \mathbb{R}^{Q \times N}$ comprises a matrix containing vectors with estimated multipath mis-modelling errors $\hat{\varepsilon}_j$, defined as
$\hat{E}(h,\beta) = \hat{\theta}_j - \hat{K}_j(h)\Sigma_{m=1}^{D}[h]_m |s(\hat{\delta t}_{int} - (\beta - m + 1) T_\delta|^2$, with
$\hat{K}_j(h) = \|\hat{\theta}_j\|/\|\Sigma_{m=1}^{D}[h]_m |s(\hat{\delta t}_{int} + (m - 1) T_\delta|^2\|$;
$\hat{\theta}_j = [\hat{\theta}_j(\delta t_1) \ldots \hat{\theta}_j(\delta t_Q)]^T \in \mathbb{R}^{Q \times 1}$ comprises an estimated cross-correlation vector for the i-th antenna, which is uniformly sampling, with a time-delay resolution $T_\delta$, the composite cross-correlation function $\theta_j(\delta t)$ at Q clock offset values, being centered at the intermediate clock bias estimation $\hat{\delta t}_{int}$ such that $\delta t_{n|n=(Q+1)/2} = \hat{\delta t}_{int}$; and $\hat{\theta}_j(\delta t_n) \triangleq \hat{\theta}_j(\delta t_n, \dot{\delta}t, p_0^T) = \hat{\theta}_j(\Phi_{0,n})$ is estimated as
$\hat{\theta}_j(\Phi_{0,n}) = x_j^H B(\Phi_{0,n} - \Delta\Phi_j)(B^H(\Phi_{0,n} - \Delta\Phi_j)B(\Phi_{0,n} - \Delta\Phi_j))^{-1} B^H(\Phi_{0,n} - \Delta\Phi_j)x_j$.

21. The receiver of claim 1, wherein the estimated clock bias has an accuracy of less than 100 nanoseconds.

22. A method of operating a receiver for use with a global navigation satellite system (GNSS) comprising multiple satellites, wherein each satellite transmits a respective navigation signal containing a spreading code, and wherein the GNSS maintains a time reference which is encoded into the navigation signals, the receiver comprising a receiver clock and at least one antenna for receiving multiple signals over multiple respective channels, each channel being defined by a transmitting satellite and a receiving antenna at opposing ends of the channel, the method comprising:
- calculating cross-correlation functions between (i) the signals received over the multiple channels and (ii) reference versions of the navigation signals provided by the receiver;
- performing a joint estimate of (i) a clock bias of the receiver clock relative to the time reference maintained by the GLASS, and (ii) a composite channel comprising the combined contribution of the multiple channels as a function of time-delay, using the calculated cross-correlation functions;
- wherein the clock bias of the receiver clock is estimated as an offset from an approximate clock bias.

23. The method of claim 22, wherein the receiver is located in an indoor environment.

\* \* \* \* \*